United States Patent Office 3,199,217
Patented Aug. 10, 1965

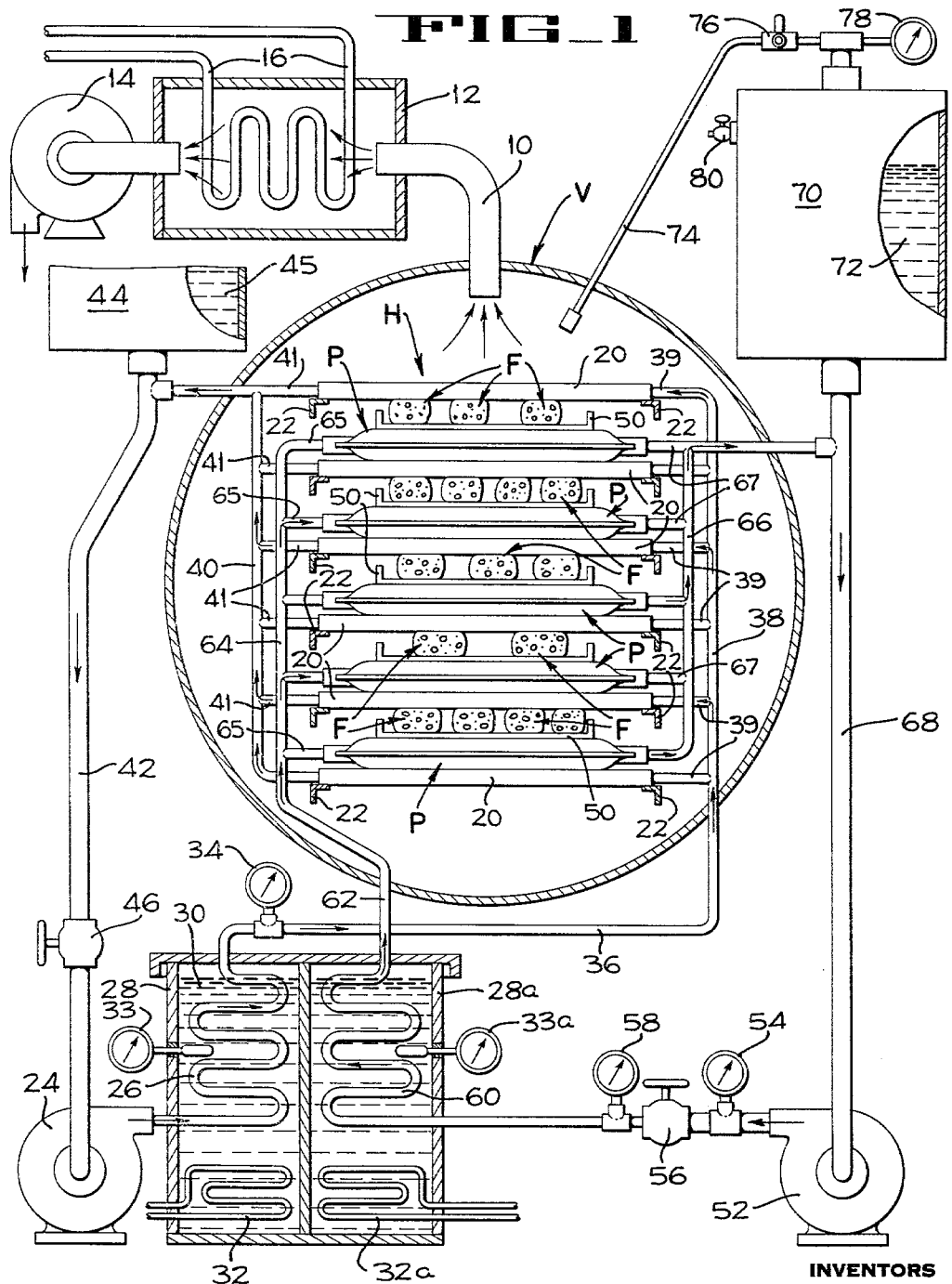

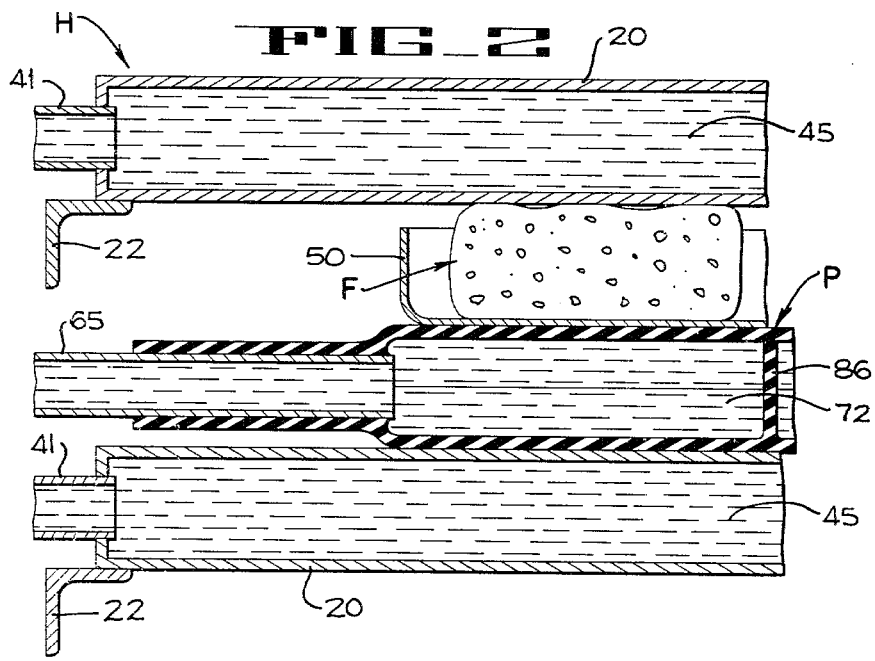
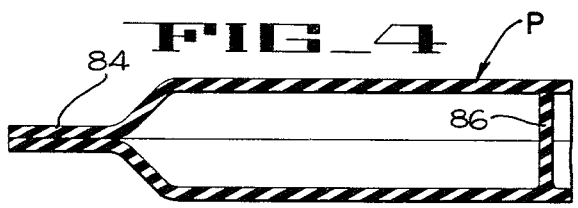
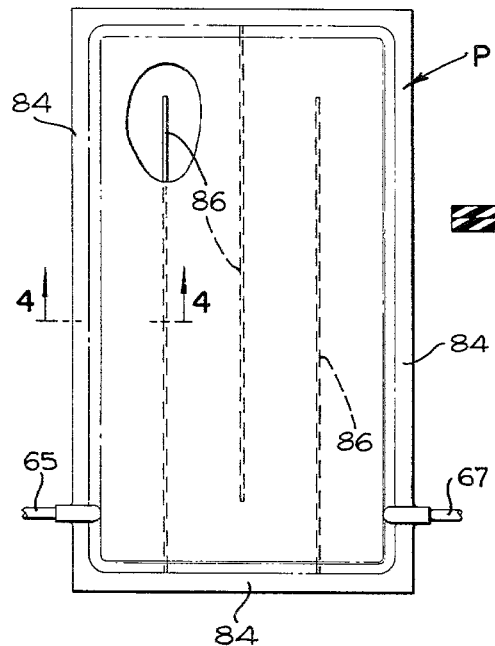

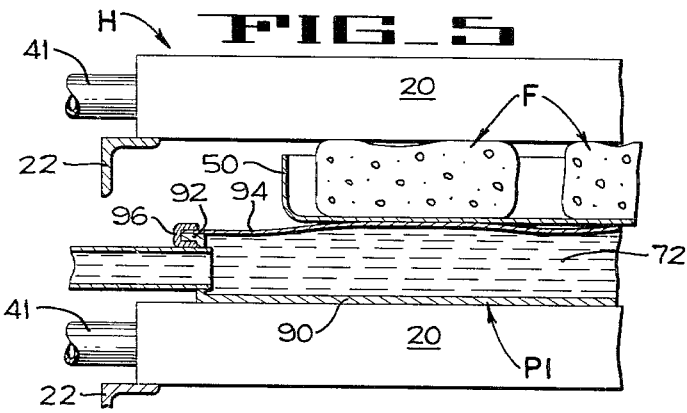
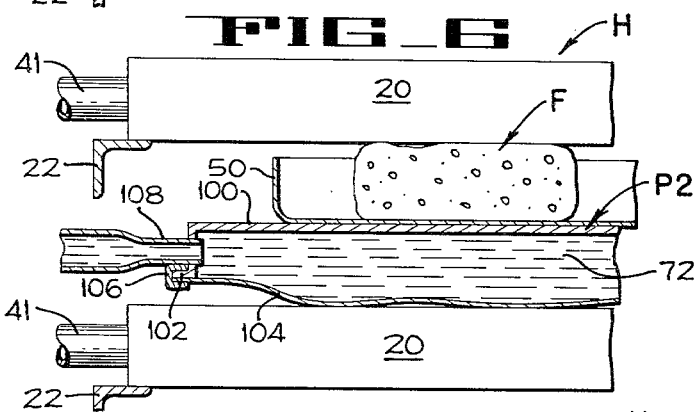
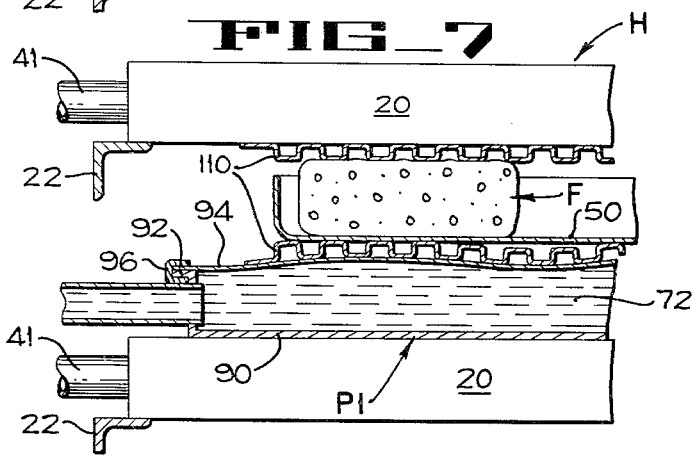
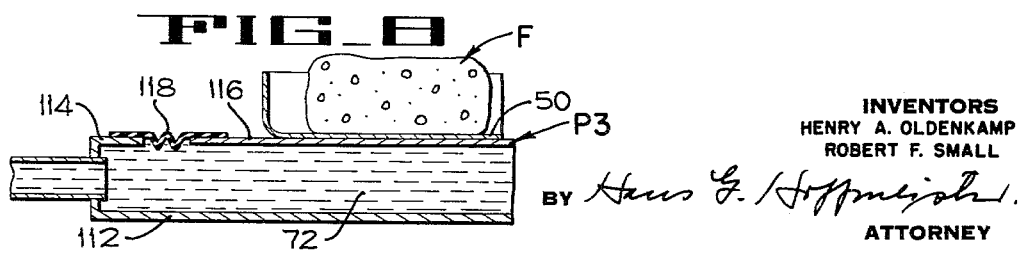
INVENTORS
HENRY A. OLDENKAMP
ROBERT F. SMALL
ATTORNEY

3,199,217
FREEZE DRYING APPARATUS WITH INFLATABLE PLATEN CONTACT HEATING
Henry A. Oldenkamp, Saratoga, and Robert F. Small, San Jose, Calif., assignors to FMC Corporation, San Jose, Calif., a corporation of Delaware
Filed Mar. 28, 1962, Ser. No. 183,213
5 Claims. (Cl. 34—92)

This invention relates to appratus for drying products such as food products by subliming the ice in the product directly into water vapor, while the products are in a vacuum chamber and more particularly concerns an improved product heating apparatus for a freeze drying unit.

The process of freeze drying provides a dry product which, in the case of food, maintains its taste and nutritive value, can be stored without refrigeration, and can be reconstituted with water to provide a palatable food. For some time the freeze drying process has been largely restricted to processes for preparation of products such as biologicals, wherein the quantities involved are such that the processes are little more than large scale laboratory operations. Prior apparatus has not been adapted for use in the food processing industry, wherein tons of products must be processed during relatively short periods of time, when the foods are fresh or freshly picked. Also, the process must be efficient in its use of heat, in order to make the process economically feasible.

One of the objects of the present invention is to provide freeze drying apparatus that makes possible economical handling or large volumes of food products in a relatively short time.

Another object of the present invention is to provide apparatus for heating the products to as high a temperature as they will withstand without heat damage, in order to shorten the process time, while insuring that the maximum safe product temperature will not be exceeded.

In order that the dried product has the desired qualities, these objects must be obtained without permitting the ice in the product to pass through the liquid phase and hence wet the product.

Briefly, the objects mentioned above are accomplished by heating the products in a vacuum chamber by direct conduction or contact heating applied to large surfaces of the products by means of heated platens, one of which is inflatable to establish top and bottom heat transfer contact with the product. The products are arranged in layers and are supported on the inflatable, heated platen which in turn, rests on a fixed heated platen. In accordance with the present invention the pressure applied to the products by inflation of each inflatable heated platen can be precisely controlled so that the mechanical contact pressure with the products will not cause the pressure on the ice in the products to exceed the pressure of the triple point of water.

Another object of the invention is to provide precisely controlled pressure contact with the frozen products by means of platens, as mentioned above, wherein the inflatable platens are simple in design and economically manufactured. Briefly, this is accomplished by forming the contact-producing means in the form of hollow platens, each having a flexible wall constructed so that the pressure of liquid in the platen increases the volume of the platen and causes contact of the product with a fixed companion platen, which is hollow so that it can be heated. The expandible heated plate itself forms a self contained hydraulic unit.

By maintaining top and bottom contact with the products under treatment, the effect of radiant heat can largely be eliminated, resulting in precise temperature control in the product. Heating by radiation is unsatisfactory because the quantity of heat transferred varies as does the fourth power of the temperature difference between the heat source and the products. Thus, when radiant heating is employed, slight variations in the temperature of the heat source, or in the temperature of the products as they become progressively dry, can greatly alter the heat transfer characteristics of the process. Since the freeze drying process is carried on in a vacuum there is virtually no heating by convection. Thus, by maintaining the elements in direct contact with the products, the erratic effects of radiation are eliminated.

Another object of the invention is to facilitate the escape of sublimed water vapor from between the product and the heated shelves or platens, as the vapor leaves the products under treatment. This is accomplished by providing heat conducting members between the heated shelves or platens and the product, which members engage the product at spaced zones to provide vapor escape paths into the vacuum chamber, the vapor being removed from the chamber by the usual vacuum pump or ejector mechanism connected to the chamber.

Another object of the invention is to provide contact heating of the product as described without subjecting the product being dried to a mechanical pressure that is sufficiently large to bring the pressure on the product above the triple point. This is accomplished by maintaining the liquid in the flexible platens at a pressure below atmospheric pressure.

Another object is to provide apparatus for maintaining the liquid in the flexible platens below atmospheric pressure, which apparatus provides precise control of the pressure in the platens. This is accomplished by utilizing the low pressure present in the drying chamber as a means for providing the pressure for the liquid in the flexible platens.

The manner in which these and other objects may be accomplished will be apparent from the following detailed description of the invention taken with the accompanying drawings, in which:

FIGURE 1 is a schematic diagram of the freeze drying system of the present invention.

FIGURE 2 is a fragmentary section on an enlarged scale showing the disposition of the fixed shelves, the inflatable platens, and the product.

FIGURE 3 is a plan, partially broken away, of an inflatable platen.

FIGURE 4 is an enlarged section taken on lines 4—4 of FIGURE 3.

FIGURE 5 is a view similar to FIGURE 2 showing a modified form of inflatable platen.

FIGURE 6 is another view similar to FIGURE 2 showing another form of inflatable platen.

FIGURE 7 is still another view similar to FIGURE 2 showing the use of vapor conducting spacers in the assembly.

FIGURE 8 illustrates still another form of inflatable platen.

Referring to the diagram of FIGURE 1, the vacuum drying chamber is indicated at V. The details of the construction of the chamber itself form no part of the present invention and, as indicated in the figure, the chamber may be a cylinder for receiving the shelves that mount the product to be dried. Suitable access doors, drains, and other accessories commonly employed in connection with vacuum drying chambers will be provided and since they form no part of the invention they are not illustrated.

In order to withdraw the air trapped in the vacuum chamber at the beginning of a cycle, and to withdraw vapor sublimed from the ice in the product during drying, an exhaust line 10 leads from the vacuum chamber to a vapor condensing chamber 12. Connected to the chamber 12 is a vacuum pump 14 which maintains the vacuum in the chamber and also removes any non-condensed water vapor. An ejector sysem may be used in place of pump 14 in accordance with conventional practice. In order to condense water vapor sublimed from the ice in the product, refrigerated coils 16 extend into the condensing chamber 12, each coil being connected to the usual refrigeration unit (not shown). After the air has been exhausted from the vacuum chamber V, sublimation begins and the water vapor sublimed from the ice in the product will condense on the refrigeration coils 16 in the form of ice crystals. The usual defrosting and drain means for the condensing unit will be provided but such are not shown as they are conventional.

In the freeze drying system of the present invention, two liquid heating and circulating systems are provided, one for the fixed shelves or platens and the other for the inflatable platens. These systems cooperate to provide a heating unit indicated generally at H, which unit supplies heat to the product and makes it possible to complete the drying process in a much shorter period of time than would be required if no heat were supplied to the product during the process. The heating unit H includes a plurality of hollow shelves or platens 20 which are mounted in fixed spatial relation within the vacuum chamber by means of angle iron supports 22. The shelves 20 are formed of a material, such as aluminum, having good heat conductivity. In order to circulate the heating liquid through the fixed shelves or platens 20, a pump 24 is provided which delivers liquid to a heating coil 26 disposed within a tank 28. The tank 28 is filled with a liquid 30 that is heated by a resistance heating unit 32. Liquid 30 serves to conduct heat from the heating unit 32 to the heating coil 26. Since the system is operated below the boiling point of water and since the tank 28 is open to atmosphere, the requirements for the liquid 30 are not critical; it need only be a relatively good conductor of heat, such as ethylene glycol. A temperature gauge 33 is installed in the tank. At the outlet of the heating coil 26 a pressure gauge 34 is fitted, from which a delivery pipe 36 leads to an inlet header 38 connected to the shelves 20 by conduits 39. The header will deliver the heating liquid to each of the fixed shelves or hollow platens 20.

Leading from the shelves are conduits 41 which open into an outlet header 40, which is connected to a return pipe 42 that directs the liquid back to the pump 24. An expansion tank 44 is provided, the upper end of which is open to the atmosphere. The heating liquid indicated at 45 in the tank is selected for operation at temperatures in the order of 140° F. and the liquid should not be volatile at this temperature. Ethylene glycol also has the required properties for this service. A valve 46 is provided in return pipe 42 for controlling flow of the heating liquid through the shelves 20.

As seen in FIGURES 1 and 2, the product F to be dried is mounted on trays 50 which are supported by the inflatable platens P. The product F may be slices of meat, fish, or suitably arranged layers of vegetables, mushrooms, or the like.

As previously mentioned, there is also a heating liquid system for the inflatable platens P. Referring to FIGURE 1, a pump 52 delivers the heating liquid, there being a presusre gauge 54 for setting the delivery pressure of the pump. The liquid is delivered to an adjustable needle valve 56, which is followed by a second pressure gauge 58. The gauges 54 and 58 when read together will give the pressure drop across the needle valve 56. The liquid is delivered to a heating coil 60 disposed in a heating tank 28a, and a delivery pipe 62 leading from the coil conducts the heating liquid to an inlet header 64. Inlet header 64 is connected to the inflatable platens P by conduits 65. An outlet header 66 and conduits 67 conduct the liquid from the inflatable platens to a return pipe 68 which returns the liquid to the pump 52.

Since the system of the invention must provide a sublimation process, it is essential that the pressure placed upon the ice crystals within the product being dried does not exceed that of the triple point of water. If the pressure does exceed that of the triple point, the ice will pass through the liquid phase before the water vapor is formed, whereupon the product will be wetted and in many cases spoiled. No problem arises from the vacuum chamber itself, because the vacuum pump maintains the vapor pressure in this chamber at a very low value which is well below that of the triple point, which is approximately 4 mm. of mercury. However, as previously mentioned, in accordance with the invention the inflatable platens are operated to cause contact heating with both the upper and lower surfaces of the product F. This means that the contact pressure between the platens and the product must not bring the net pressure exerted upon the ice crystals in the product above the triple point. This requires that the pressure of the heating liquid within the inflatable platens be below atmospheric pressure, since a very high vacuum is maintained in the drying chamber, the fluid pressure applied to the inflatable platens P, although sufficient to produce contact heating, will be a sub-atmospheric pressure, and should be not substantially greater than one pound per square inch absolute to avoid melting of the ice crystals in the product. In order to meet these conditions, a closed tank 70 is mounted on the return pipe 68. This tank holds a head of the heating liquid for the inflatable platens, indicated at 72. The liquid employed for this purpose must be stable or relatively non-volatile at very low pressures, and we have found that a petroleum oil such as a turbine oil is satisfactory for this purpose. An oil suitable for this purpose has a specific heat of .482 at 140° F., a viscosity of 156 S.S.U. at 100° F., and a vapor pressure of .004 mm. Hg at 150° F. In order to avoid the establishment of an excessive atmospheric head on the heating liquid 72, a tank bleeder line 74 extends from tank 70 into the vacuum chamber. This line is connected to the tank 70 by means of a two-way valve 76, and the pressure of the gas above the liquid 72 in the tank is indicated by a vacuum gauge 78. An air inlet bleeder cock 80 is also fitted to the tank. The operation of the system will be described presently.

FIGURES 2–4 show construction details of one of the inflatable platens P. The platen illustrated is formed of fabric-reinforced rubber material. The reinforcement is a nylon fabric and the rubber is a synthetic oil resistant rubber compound, such as Hycar. The walls are joined by seams 84 and between the walls are formed baffles 86 that provide a sinuous passage for the heating liquid as it passes through the platen. The tubes 65 and 67 which connect the platens to the inlet header 64 and outlet header 66 are bonded between the wall parts of the platen. Other flexible materials may be used to form the platen, such as thin sheets of corrugated aluminum or other thin, flexible, heat conducting material.

The rubber platen walls illustrated have the advantage of being readily conformed to any irregularities, and also assure uniform pressure contact across their surfaces. The thermal conductivity of the rubber material itself is not critical. The fact that rubber has a relatively low thermal conductivity merely results in a slight delay before the system attains thermal equilibrium. However, the rubber can be compounded with heat conductive materials such as metallic oxides or the like, to improve its thermal conductivity.

In operation, the trays 50 are loaded with the product F to be dried which, as illustrated, may be patties of ground beef. The door to the vacuum chamber is closed and the vacuum pump or ejector started. The pressure in the vacuum chamber is brought well below that of the triple point of water, which is somewhat over 4 mm.

of mercury, so that sublimation can take place. Heated liquid is then circulated through both the inflatable and the fixed platens. As the pressure in the vacuum chamber is lowered, the air trapped above the liquid 72 in the tank 70 will apply a steadily increasing pressure to the inflatable platens. This action, if permitted to continue, would bring the mechanical pressure against the product above that of the triple point, and thereby prevent the desired sublimation. In order to provide a precisely controlled sub-atmosperic pressure in the tank 70, valve 76 is opened; whereupon, the air trapped above the liquid 72 in the tank is withdrawn by the vacuum pump through bleeder tube 74. As the vacuum pump pulls the vacuum in the vacuum chamber, pressure above the column of liquid 72 in the tank 70 is correspondingly reduced. This prevents mechanical pressure against the food product from rising above that corresponding to the triple point of water. When the final conditions are reached in the vacuum chamber V, the pressure in the chamber will be very low and in fact may be as small as one hundredth of a millimeter of mercury. The pressure of the air trapped above the liquid 72 in tank 70 is not maintained at this low a value, because the air trapped in the tank supplies part of the force applied to the inflatable platens. Accordingly, the vacuum gauge 78 is observed, and the valve 76 in the bleeder tube 74 is closed when the pressure trapped above the liquid in the tank 70 is in the order of 1 pound per square inch absolute. This pressure is sufficient to inflate the platens and establish heating contact, without raising the pressure exerted against the ice crystals in the product above the triple point.

The needle valve 56 that controls the circulation of heating liquid in the inflatable platen P is adjusted by observing the gauges 54 and 58, to insure that the pressure of the heating liquid in the hollow platens does not exceed the desired value. The total pressure within the hollow platents is kept below the pressure corresponding to the triple point of water by manipulation of the bleeder valve 76 and the needle valve 56, as described.

Some of the heat reaching the lower surface of the product is applied directly from the fluid circulating in the hollow platens, and some of the heat is supplied from the fluid circulating in the fixed platens or shelves 20 with the inflatable platens P serving as intermediate heat conductors for such heat. If the temperature gradient across the walls of the inflatable platens is steep, the temperature of the tank 28a that heats the liquid circulating in the hollow platens may be adjusted to be somewhat higher than the temperature in the tank 28 that heats the liquid circulating through the fixed shelves.

By establishing direct contact with the top and bottom surfaces of the product, virtually all of the heating is by direct conduction or contact heating, and the temperature of the product can be controlled more precisely than is the case where radiant heating is relied upon. The temperature of the product can be controlled by mounting thermocouples on the trays, as disclosed and claimed in the copending application of Abbott et al. S.N. 102,703, filed April 13, 1961, now Patent No. 3,132,930, issued May 12, 1962 and assigned to the assignee of this application. As explained in the aforesaid copending application, the temperature of the trays is a good indication of the product temperature, and can be used as a means to indicate when the freeze drying process has been completed. When the process has been completed and the vacuum chamber is opened, atmospheric pressure will deflate the inflatable platens and permit removal of the dried product. The air inlet cock 80 on tank 70 is opened at this time.

FIGURE 5 illustrates a modified form of inflatable platen. The platen P1 is formed of a metal container 90 having a flanged rim 92. A sheet of thin flexible material, such as aluminum foil 94, is joined to and sealed with the flange 92 by means of a sealing strip 96. The flexible sheet 94 forms the inflatable element of the platen, and when the differential pressure is applied to the liquid within the platen, sheet 94 lifts the tray and food product until the food product engages the lower surface of the fixed or upper platen 20. In this form, as in that previously described, the inflatable platen rests on a lower fixed, hollow shelf or platen 20 so that each layer of product is supported independently of the layer above, and hence is not subjected to the weight of the layers above.

FIGURE 6 illustrates another form of platen P2. Here, the metal body or shelf 100 is formed with a flanged rim 102 to which is clamped and sealed a sheet of flexible material 104 by means of a sealing strip 106, as previously described. However, in this case the flexible sheet 104 is on the bottom, and when the platen is inflated, the shelf 100 is raised to bring the product into contact with the upper shelf 20. The inlets of the header 64 may be flattened as at 108, to accommodate the inlets in the space available with this construction.

FIGURE 7 illustrates the use of means for facilitating evacuating of water vapor from the areas at the top and bottom of the product. To provide channels for the escape of vapor, corrugated members 110 are mounted on the top of the product and beneath the trays. These members may be made of aluminum foil and, being somewhat flexible, they accommodate themselves to the upper surface of the product. Corrugated members 110 may be applied to any of the platens of the invention.

FIGURE 8 illustrates still another form of inflatable platen, P3. Here, the body or shelf 112 has an inwardly directed flange or rim 114. To provide the inflation action, a relatively rigid wall 116 is provided, the wall being of smaller dimension than that of the flange 114. The space between wall 116 and flange 114 is bridged by a flexible diaphragm 118 bonded to both members. The diaphragm is preferably formed of fabric reinforced rubber material joined either by vulcanization or by cementing to the metal parts 114, 116. The action of the platen P3 in pressing the food product against the shelf above it is the same as that of the other platens previously described.

Having thus described the present invention and the manner in which the same is to be used, what is claimed as new and described to be protected by Letters Patent is:

1. Apparatus for subliming the ice in frozen products comprising a vacuum chamber, means for maintaining the vapor pressure in said chamber below the triple point pressure of water, product heating means in said chamber for conducting heat to the lower and upper surfaces of the product, said product heating means comprising lower and upper spaced hollow inflatable platens, corrugated members on opposed faces of said platens for engaging the product and conducting heat thereto while providing for vapor escape, one of said platens having a flexible wall, means for supporting the platens in said chamber, liquid supply means for directing heated liquid to said platens at a pressure sufficient to flex the flexible wall of said one platen and increase the volume of the platen to bring said product heating means into heat conducting engagement with the product, and pressure regulating means connected in said liquid supply means for limiting the pressure applied to the ice in the product by said corrugated members to a unit value below that of the triple point of water.

2. Apparatus for subliming the ice in frozen products comprising a vacuum chamber, means for evacuating said chamber to a vapor pressure below the triple point pressure of water, product heating means in said chamber for conducting heat to the lower and upper surfaces of the product, said product heating means comprising rigidly mounted vertically spaced hollow platens, a product supporting inflatable platen resting on the lower of said spaced platens, said product supporting platen having opposed walls for application of fluid under pressure to inflate said platen, means for circulating heated liquid through said rigidly mounted platens, means for circulating heated liquid through said inflatable platen, at a pressure sufficient to increase the separation of the walls thereof and bring a product supported by the platen into heat conducting engagement with the rigidly mounted platen above, said latter circuilating means comprising a pump for delivering liquid to the platen, a return line from the platen to the pump, a closed expansion tank connected to the upper portion of said return line, a bleed line leading from a portion of said tank that is above the liquid level therein to said vacuum chamber, and a valve in said bleed line for trapping air in said tank at a sub-atmospheric pressure for limiting the pressure applied to the ice in the product by the liquid in said product supporting platen to a unit value below that of the triple point of water.

3. Freeze drying apparatus for subliming ice from a frozen product containing the same, comprising a vacuum chamber; means for maintaining the vapor pressure in said chamber below the triple point pressure of water; a plurality of horizontal, vertically spaced, hollow, rigid support platens, means in said chamber for supporting said support platens so that they each have opposed, facing walls; means for circulating a first body of heating liquid through said support platens at a pressure no less than atmospheric pressure; an inflatable platen between adjacent support platens and having vertically spaced, horizontal walls; the lower wall of each inflatable platen engaging the upper wall of one of said support platens; a product tray resting on the upper wall of each inflatable platen for retaining said frozen product containing ice to be sublimed; means for circulating a second body of heating liquid through said inflatable platens for causing the upper wall of each inflatable platen to bring products in the trays against the lower wall of the adjacent support platen; and pressure regulating means connected into said means for circulating said second body of liquid through said inflatable platens for limiting the pressure applied to the product containing said ice by said upper inflatable platen wall to the unit value below the triple point pressure of water.

4. The apparatus of claim 3, wherein heat conducting means are provided at the lower wall of said adjacent support platen for engaging the product at spaced zones to provide for water vapor escape.

5. Freeze drying apparatus for subliming ice from a frozen product containing the same, comprising a vacuum chamber; means for maintaining the vapor pressure in said chamber below the triple point pressure of water; a plurality of horizontal, vertically spaced, hollow, rigid support platens, means in said chamber for supporting said support platens so that they each have opposed, facing walls; means for circulating a first body of heating liquid through said support platens at a pressure no less than atmospheric pressure; an inflatable platen between adjacent support platens and having vertically spaced, horizontal walls; one wall of each inflatable platen engaging one wall of one of said support platens; a tray for retaining said frozen product between the other wall of each inflatable platen and the other wall of the other of said adjacent support platens, said tray being supported by the other wall of one of said platens; means for circulating a second body of heating liquid through said inflatable platens for bringing products in the trays against the other wall of the platen that faces the top of the tray; and pressure regulating means connected into said means for circulating said second body of liquid through said inflatable platens for limiting the pressure applied to the product containing said ice by said inflatable platen to a unit value below the triple point pressure of water.

References Cited by the Examiner

UNITED STATES PATENTS

| 2,254,406 | 9/41 | Zarotschenzeff | 62—341 |
| 2,434,003 | 1/48 | Morrison | 34—5 |
| 2,445,120 | 7/48 | Levinson et al. | 34—5 |
| 2,453,033 | 11/48 | Patterson | 34—5 |

OTHER REFERENCES

"Physics For Science and Engineering," by W. White et al. (1958 Edition) page 210.

NORMAN YUDKOFF, *Primary Examiner.*